_Patented Oct. 10, 1933_ 1,930,448

UNITED STATES PATENT OFFICE

1,930,448

COAGULATION OF COLLOIDAL SOLUTIONS

Ray H. Boundy and James L. Amos, Midland, Mich., assignors to The Dow Chemical Company, Midland, Mich., a corporation of Michigan No Drawing. Application June 6, 1932
Serial No. 615,759

7 Claims. (Cl. 252—6)

The invention relates to methods for coagulating suspended matter and in particular regards a new composition of matter constituting an improved coagulating agent.

The property of ferric chloride to produce flocculation in colloidal suspensions is well recognized. It is also known that, in general, the efficiency of coagulating electrolytes having polyvalent ions increases with the valence of the cation. However, the use of salts of higher valent metals, such as antimony, bismuth, etc., for coagulating agents has been prevented due to the fact that upon introduction thereof into hydrosols such salts are decomposed by water to form insoluble oxides which are inactive as coagulants. The oxides so produced are in a form which is difficult to filter efficiently. For the reasons stated the theoretical advantage of the greater coagulant effect of such compounds is thus nullified.

We have now found that, by incorporating a relatively small amount of an antimony compound such as the sulphate, nitrate, bromide, etc., but preferably the pentachloride, which is soluble in a ferric chloride solution, with ferric chloride, an improved coagulating agent is produced. In such agent the superior coagulative value of the higher valent antimony compound is efficiently utilized, and the disadvantage of decomposition of the antimony salt does not attach thereto.

To the accomplishment of the foregoing and related ends, the invention, then, consists of the method and product hereinafter fully described and particularly pointed out in the claims, the following description setting forth in detail several modes of carrying out the invention, such disclosed modes illustrating, however, but several of various ways in which the principle of the invention may be used.

Ferric chloride is now generally used in the coagulation of various types of colloidal suspensions. We have found that antimony pentachloride may be incorporated into ferric chloride with distinctly advantageous results from the standpoint of increased coagulating value, a better sedimentation rate of the floc produced, decreased filtering time in separating the floc, etc. The amounts of the antimony compound to be employed may be varied within the range between about 1 and 10 per cent, preferably between about 1.5 and 4 per cent, based on the weight of anhydrous ferric chloride. Ferric chloride is commonly available for commercial purposes in aqueous solution containing between about 20 and 60 per cent by weight of ferric chloride calculated as anhydrous. To increase the coagulating efficiency of such aqueous solutions we may incorporate therewith amounts of antimony pentachloride or equivalent antimony compound within the ranges just set forth, based on the weight of ferric chloride therein present calculated on an anhydrous basis.

Colloidal solutions are roughly divided into two groups; lyophilic sols, wherein the dispersion medium and the dispersed part possesses a marked affinity for each other; and lyophobic sols, distinguished by the absence of such affinity. Among the lyophilic sols which may be treated with our improved coagulant are hydrophilic sols such as sewage, industrial or trade wastes, city water supplies, etc.

As an illustration of the result which can be obtained in practicing our invention upon lyophilic sols in general, we will describe the coagulation of the solid matter of a particular hydrophilic sol consisting of a digested domestic sewage sludge. The table shows the effect upon the filtering rate of coagulated samples of the sludge using as a coagulating agent ferric chloride alone, and the beneficial results obtained by incorporating antimony pentachloride into the ferric chloride before use thereof as a coagulant.

The method of conducting the tests consisted in treating 100 milliliter samples of the sludge with varying amounts of the coagulating agent in aqueous solution, allowing the so treated sample to stand for 5 minutes, and then filtering the sample under an absolute pressure of about 25 centimeters of mercury in a Buchner funnel until 60 milliliters of effluent were drawn through the filter. The time of filtering represents a measure of the coagulating value of the agent used, the shorter the period required to obtain the 60 milliliters of filtrate, the higher is the coagulation value of the agent. It is to be noted that the time required to withdraw 60 milliliters of effluent from a 100 milliliter sample of sludge which has not been treated with a coagulant is about 4 hours.

Example 1

The ferric chloride employed in the following tests was utilized in an aqueous solution containing about 37.5 per cent by weight of the anhydrous salt. The improved coagulating agent employed consisted of an aqueous solution containing 37.5 per cent by weight of an anhydrous mixture wherein the proportion of ferric chloride to antimony pentachloride was 97.5 per cent of the ferric salt to 2.5 per cent of the antimony compound by weight.

The amount of coagulating agent used in the tests is shown in the table following in percentage thereof based on the weight of solid matter in the sludge which contained 6 per cent by weight thereof, all figures being calculated on an anhydrous basis.

| Per cent coagulant | Time of filtering | |
|---|---|---|
| | $FeCl_3$ | $FeCl_3 + 2.5\% SbCl_5$ |
| | Seconds | Seconds |
| 9.0 per cent | 220 | 120 |
| 13.5 per cent | 120 | 45 |
| 18.0 per cent | 70 | 80 |
| 23.0 per cent | 140 | 160 |

It will readily be seen from the foregoing example that the coagulating value of the antimony pentachloride-ferric chloride composition in the treatment of a lyophilic sol is markedly higher than that of the ferric chloride alone. Thus, our improved composition provides the distinct advantage of permitting the use of much smaller quantities of ferric chloride to accomplish a comparable degree of flocculation; meanwhile effecting a saving in filtering capacity by producing a floc which, under optimum conditions, filters in a much shorter time than that required to filter the floc produced by the ferric chloride alone.

A comparable increased coagulating value is exercised by our composition when applied to the flocculation of lyophobic sols. For instance, a saline hydrophobic silver iodide sol was treated with aqueous solutions of ferric chloride and ferric chloride-antimony pentachloride mixture, respectively, with the following results:—

Example 2

Separate samples of 100 milliliters of a salt brine containing 40 parts per million of iodine as sodium iodide were placed in Nessler tubes and the theoretical amount of silver nitrate required to convert the iodide to the silver salt was added thereto. The solutions were then stirred for a moment to insure complete reaction between the silver nitrate and sodium iodide. Then 5 milligrams of anhydrous ferric chloride dissolved in 7 milligrams of water was added to one of the samples, and simultaneously 5 milligrams of an anhydrous mixture, containing by weight 98.75 per cent of ferric chloride and 1.25 per cent of antimony pentachloride, dissolved in 7 milligrams of water, was added to the other sample and the solutions agitated lightly. The floc formed in the tubes by the action of the coagulant was permitted to settle and the time required in each case was noted. The sedimentation rate of the floc produced by the ferric chloride-antimony pentachloride mixture was approximately 30 per cent faster than that produced by the ferric chloride. The turbidity of the two supernatant liquids was measured, and that in the tube wherein coagulation was caused by the mixture of ferric chloride-antimony pentachloride was found to be approximately only 50 per cent of the turbidity of the other sample.

Among the advantages which inhere to our new coagulant composition are the following:—
(1) The effective coagulation value of the composition is higher as compared with ferric chloride alone; (2) the floc produced thereby in the coagulation of various sols has a higher rate of sedimentation; (3) the turbidity of the supernatant liquid wherein the coagulation has been caused thereby is lower; and (4) the floc produced thereby in the treatment of sols may be filtered more rapidly.

Other modes of applying the principle of our invention may be employed instead of those explained, change being made as regards the proportions of the materials employed, provided the ingredients stated by any of the following claims or the equivalent of such stated ingredients be employed.

We therefore particularly point out and distinctly claim as our invention:—

1. A composition of matter comprising ferric chloride in aqueous solution and a relatively small amount of an antimony compound soluble in the ferric chloride solution.

2. A composition of matter comprising ferric chloride and a relatively small amount of antimony pentachloride.

3. A composition of matter consisting of between about 90 and 99 per cent of ferric chloride and between about 1 and 10 per cent of antimony pentachloride.

4. A composition of matter consisting of an aqueous solution containing between 20 and 60 per cent by weight of a mixture of ferric chloride and antimony pentachloride in the proportion of between about 90 and 99 per cent of ferric chloride and between about 1 and 10 per cent of antimony pentachloride.

5. A composition of matter consisting of an aqueous solution containing between about 20 and 60 per cent by weight of a mixture of ferric chloride and antimony pentachloride in the proportions of approximately 97.5 per cent of ferric chloride and approximately 2.5 per cent of antimony pentachloride.

6. In a method of coagulating colloidal suspensions, the step which consists in adding thereto a coagulating agent comprising an aqueous ferric chloride solution having incorporated therewith a relatively small amount of an antimony compound soluble in the ferric chloride solution.

7. In a method of coagulating colloidal suspensions, the step which consists in adding thereto a coagulating agent comprising ferric chloride having incorporated therewith a relatively small amount of antimony pentachloride.

RAY H. BOUNDY.
JAMES L. AMOS.